United States Patent [19]
Schumacher et al.

[11] 3,951,668
[45] Apr. 20, 1976

[54] MULTICOLOR PRINTING

[75] Inventors: Ernst Schumacher, Frankfurt am Main; Hans Bremer, Nieder-Ramstadt; Rolf Herold, Bad Homburg vor der Hobe, all of Germany

[73] Assignee: Druckfarbenfabrik Gebr. Schmidt GmbH, Frankfurt am Main, Germany

[22] Filed: July 5, 1973

[21] Appl. No.: 376,563

[30] Foreign Application Priority Data

July 6, 1972 Germany .......................... 2233165

[52] U.S. Cl. .................................. 106/20; 101/211; 106/25; 106/26; 106/27; 106/28; 106/29; 106/30; 106/31; 106/32

[51] Int. Cl.[2] .................... B41M 1/14; C09D 11/02; C09D 11/06; C09D 11/08

[58] Field of Search ............................ 106/20–32; 101/211, 115, 135, 151, 171

[56] References Cited

UNITED STATES PATENTS

| | | | |
|---|---|---|---|
| 2,666,715 | 1/1954 | Syreeni | 106/309 |
| 3,213,787 | 10/1965 | Miller | 101/211 |
| 3,381,612 | 5/1968 | Lecha | 101/211 X |
| 3,420,170 | 1/1969 | Smith | 101/211 X |
| 3,427,967 | 2/1969 | Thielen | 101/211 |
| 3,470,054 | 9/1969 | Tyrrell | 101/211 X |

OTHER PUBLICATIONS

Hardy et al., *The Reproduction of color.* In Interchemical Review, ed. by Mildred Forman, N. Y., Research Laboratories of Interchemical Corp. Vol. 9, Spring–Summer 1950, Nos. 1–2, pp. 3–12.

*Primary Examiner*—Joan E. Welcome
*Attorney, Agent, or Firm*—Kurt Kelman

[57] ABSTRACT

A multicolor printing method for reproducing varicolored images on substrates having a white surface by printing with inks of three primary colors, i.e. a color absorb blue (cab) which is a yellow, a color absorb green (cag) which is a red-violet and a color absorb red (car) which is a blue-green, producing printed colors having spectral density curves passing through matching ranges of optical densities at characteristic wavelengths in the visible spectrum, the ranges being within the following parameters:

| Range of Wavelengths | Optical density in % of $D_{max}$ cab | cag | car |
|---|---|---|---|
| 407 to 423 nm | 65 to 93 | 2 to 27 | 39 to 79 |
| 453 to 456 nm | 89 to 101 | 10 to 25 | 12 to 25 |
| 492 to 496 nm | 60 to 74 | 65 to 81 | 1 to 10 |
| 538 to 541 nm | 4 to 14 | 88 to 103 | 13 to 25 |
| 584 to 591 nm | 1 to 3 | 50 to 75 | 65 to 88 |
| 633 to 646 nm | 1 to 3 | 1 to 4 | 84 to 109 |

$D_{max}$ marking the range of the maxima of the three spectral density curves, which is spaced from the optical density of the white surface $D_0$ by a distance corresponding to the density of the solid areas obtained by printing with normal inking.

4 Claims, 6 Drawing Figures

MULTICOLOR PRINTING

Figure 1:
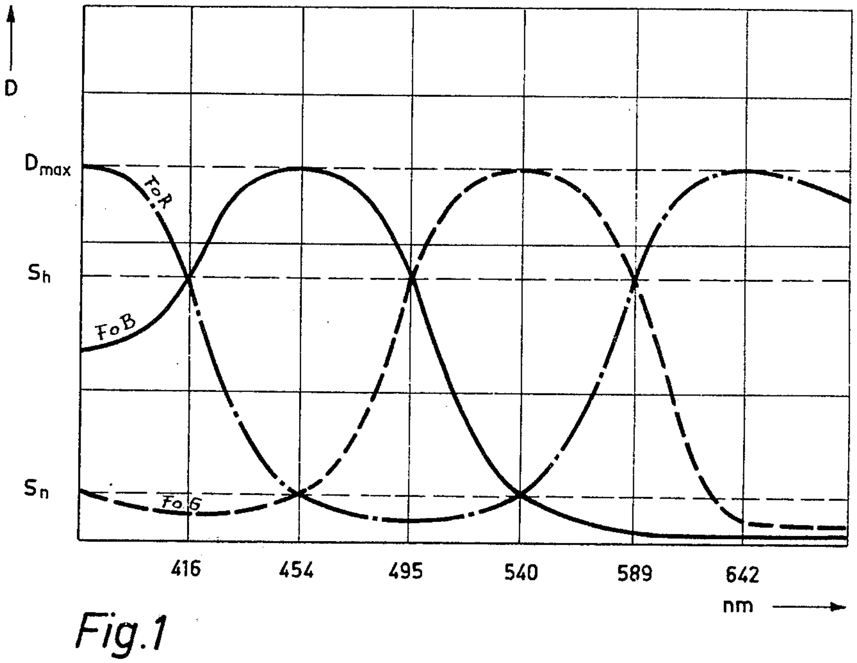

The present invention relates to improvements in printing a varicolored image on a substrate having a white surface, and in particular to the choice of the primary colors and of the process inks producing these colors by providing new spectral criteria for their coloristic attributes.

As is known, the reproduction of varicolored or multi-chromatic images in multicolor printing is a multistage process. The object of this process is the reproduction of a varicolored, spatial and moving reality in a multiplicity of two-dimensional and immobile copies of pictures in such a manner that the viewer of these pictures will perceive them as coming as close as possible to reality without using too much imagination. The same applies to the color reproduction of two-dimensional images, such as paintings, drawings, sketches, photographs, etc., which should be reproduced in a multiplicity of copies without any substantial color distortion.

Actually, the reproduction begins with the perception which is transmitted to the viewer by the use of his eyes when he observes reality or an image. Usually, the first step is a photographic picture to produce, preferably, a color transparency to serve as the original copy. In multicolor printing, the original copy is then subjected to color separation, i.e. the making of color component images, whereupon the printing plates are prepared and used for printing. This procedure is followed in all conventional color reproduction processes, such as letterpress, intaglio and lithoprinting, as well as in printing procedures working without pressure, such as screen printing and electrostatic, ferromagnetic, light-electric and thermic reproduction processes, and any other reproduction process. The reproduction cycle is concluded when the viewer looks at the reproduced image.

Taking into account all nuances, shades and tones, it is possible to differentiate millions of different colors, all colors being characterized by hue numbers, degrees of saturation and darkness (see Deutsche Industrie Norm DIN 6164). Satisfactory color reproductions should produce at least hundreds or thousands of different colors. To obtain this effect, substrates, such as paper, having a white surface are printed with a very small number, usually three or four, dosed layers of printing inks of differing color intensity, depending on the requirements of the various components or elements of the picture.

Throughout the specification and claims, the term "coloring medium" means a formulated preparation of colorants (DIN 55943-45), such as inorganic or organic pigments, organic dyestuffs used for the preparation of printing inks, paints and the like, to color a surface to impart to it a desired color. The term "color" is limited to the sensation evoked as a specific response to stimulation of the eye and its attached nervous mechanisms by radiant energy of certain wavelengths and intensities. Thus, the term "color" is limited strictly to the optical perception of the viewer and does not extend to the substance used for coloring.

The layers of coloring media printed on a white surface absorb a portion of the spectrum of white light impinged thereupon so that the eye of the viewer senses the remainder of the light reflected by the white background as color. When several layers of coloring media, each of a different primary color, are mixed in a single element of the image, several spectral portions are absorbed simultaneously so that a smaller part of the spectrum of the impinging light is reflected from the white background, causing the eye to sense a mixed color produced by the substractive mixture of the primary colors. True color reproduction of an image will depend on the accurate and correct placing and dosing of the layers of coloring media, i.e. (1) on the preparation of the printing plates and the precision of the printing process as well as (2) the optical properties of the coloring media, i.e. the printing inks. For best results, the layers of coloring media should be as transparent as possible so that the desired mixed colors are produced when a series of layers are superposed and the color sensation is not primarily determined by the uppermost layer. Futhermore, the coloristic properties of the primary colors are decisive for the quality of the color reproduction.

It is the primary object of the present invention to provide new criteria for the coloristic properties or attributes of primary colors of coloring media used to reproduce varicolored images so as to improve one aspect of multicolor printing.

This and other objects are accomplished according to this invention by reproducing a varicolored image on a white background by printing thereon with printing inks of three primary colors, i.e. a yellow color absorbing blue, a red violet color absorbing green (cag) and a blue-green color absorbing red (car), which inks produce printed colors having spectral density curves passing through matching ranges of optical densities at the characteristic wavelengths in the visible spectrum, the ranges being within the following parameters:

| Range of Wavelengths | Optical density in % of $D_{max}$ cab | cag | car |
|---|---|---|---|
| 407 to 423 nm | 65 to 93 | 2 to 27 | 39 to 79 |
| 453 to 456 nm | 89 to 101 | 10 to 25 | 12 to 25 |
| 492 to 496 nm | 60 to 74 | 65 to 81 | 1 to 10 |
| 538 to 541 nm | 4 to 14 | 88 to 103 | 13 to 25 |
| 584 to 591 nm | 1 to 3 | 50 to 75 | 65 to 88 |
| 633 to 646 nm | 1 to 3 | 1 to 4 | 84 to 109 |

$D_{max}$ marking the range of the maxima of the three spectral density curves, which is spaced from the optical density of the white background $D_o$ by a distance corresponding to the density of the solid areas obtained by printing with normal inking. The abbreviation "nm" designates nanometer ($10^{-9}$m).

Figure 2:
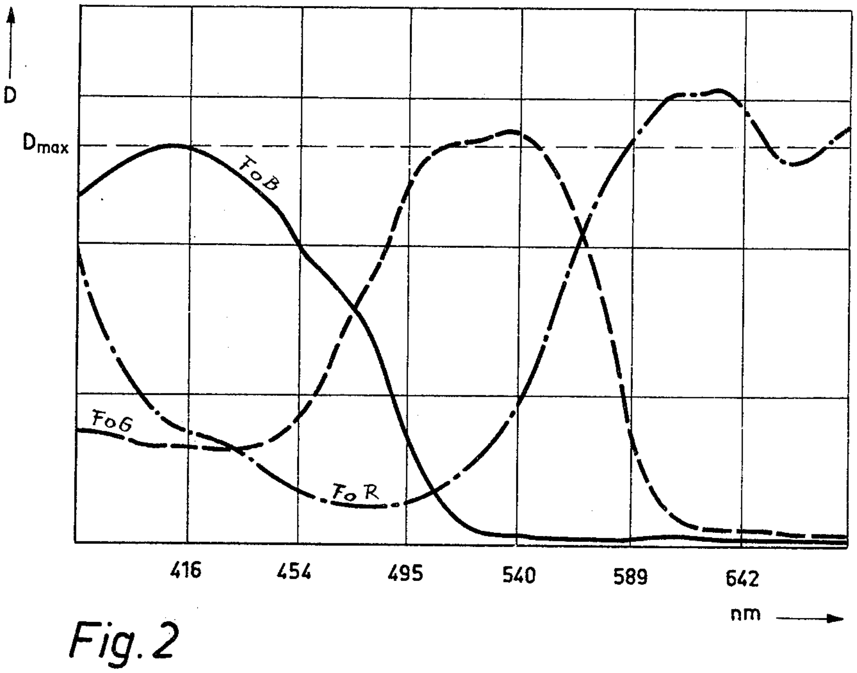
Figure 3:
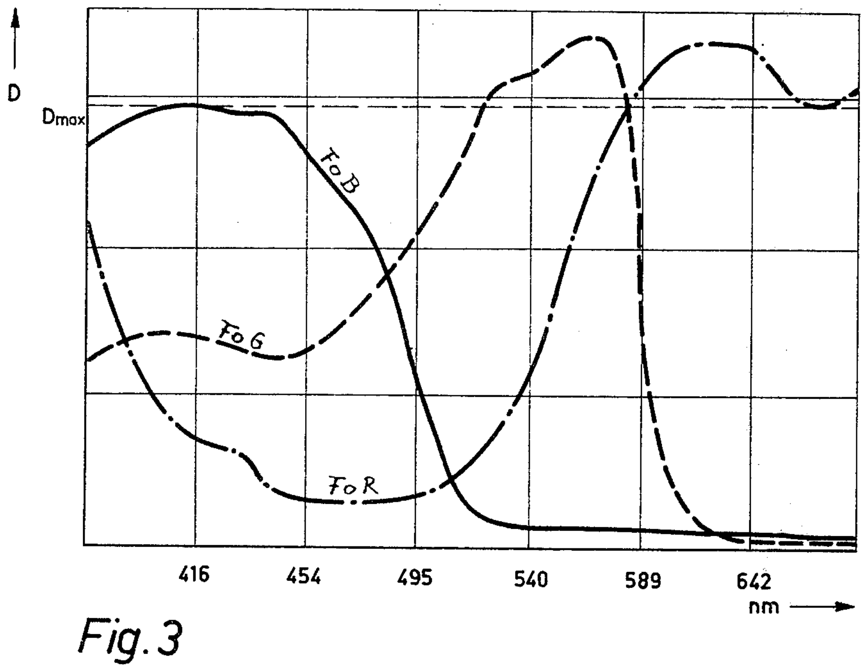
Figure 4:
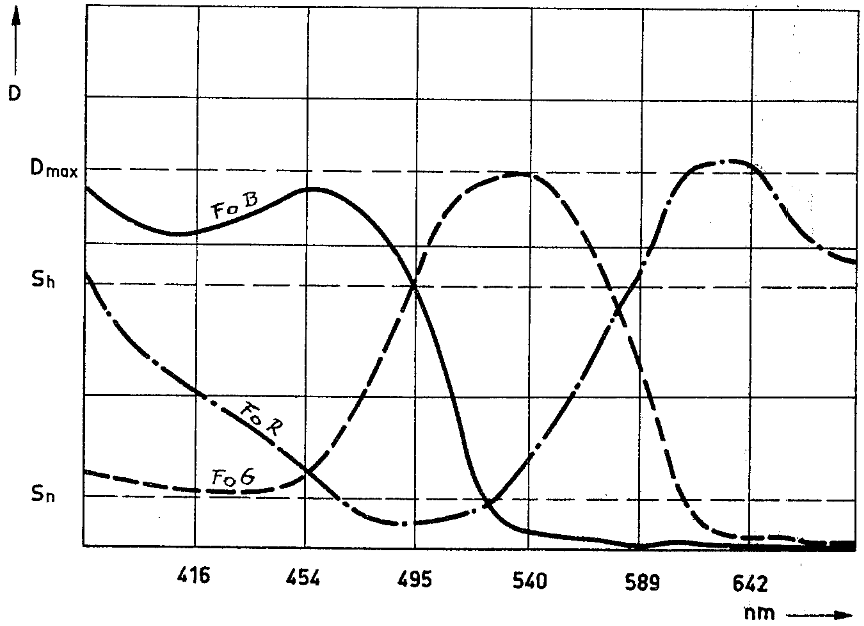
Figure 5:
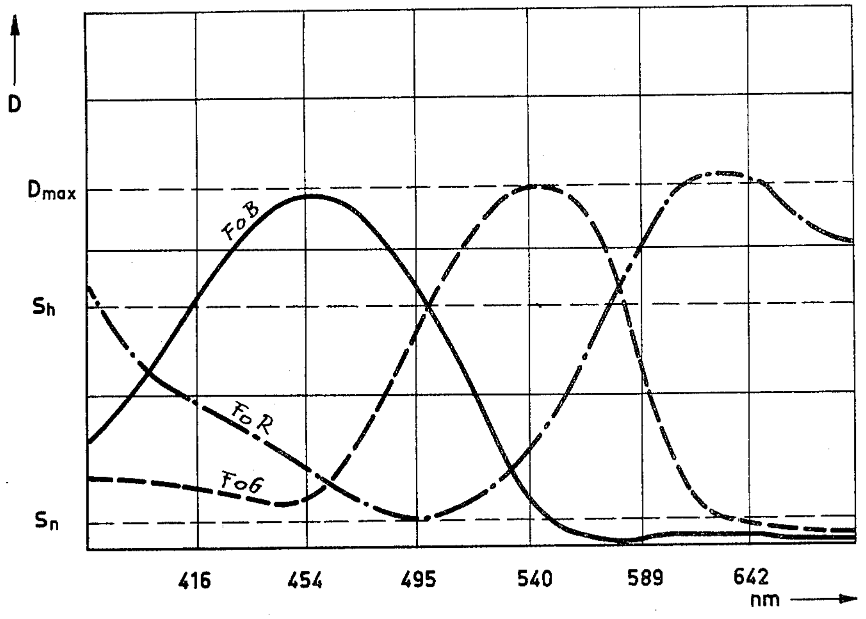
Figure 6:
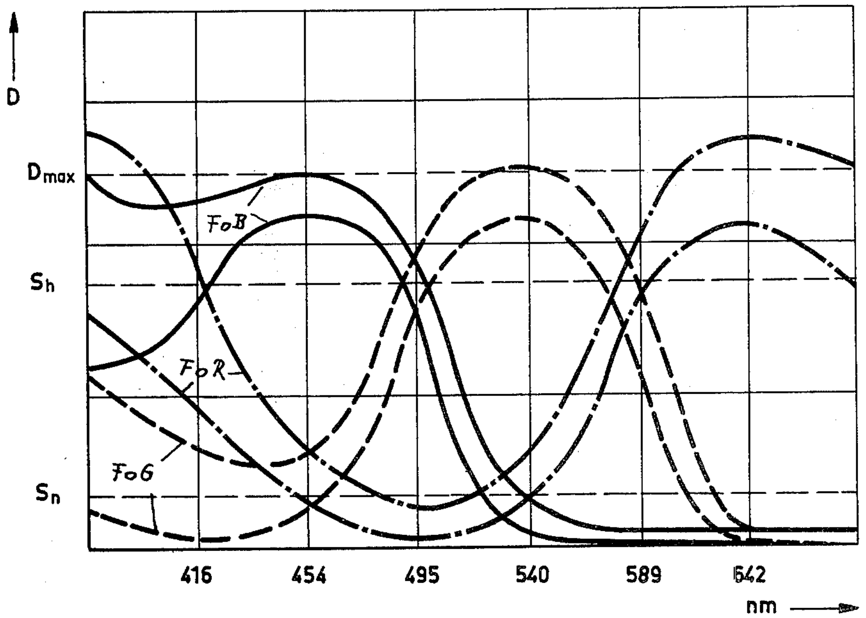

The above and other objects and features of the invention will become more apparent from the following detailed description thereof, taken in conjunction with the accompanying drawing illustrating spectral curves, wherein FIG. 1 illustrates an ideal set of the three primary colors combined in accordance with this invention;

FIGS. 2 and 3 illustrate the respective sets of three primary colors according to DIN 16508 and DIN 16538;

FIGS. 4 and 5 exemplify, respectively, novel sets of reproduction colors produced by pigments and soluble dyes as coloring media by the combination of the invention; and FIG. 6 shows the range of tolerances for sets of primary colors within the scope of the invention.

Conventional multicolor printing methods generally use printing inks producing three primary colors which are either combined with black in four-color printing processes, or may be used alone in three-color processes. The primary colors have been selected on the basis of the well known fact that all colors can be produced by mixing coloring media of the three primary colors yellow, red and blue. It was observed that some of the mixed colors are purer and more saturated than others so that attempts have been made to displace the primary colors yellow, red and blue in the color cycle in such a manner that a balanced set of colors results. To achieve this, the yellow and blue was given a green tinge (cyan blue) and the red was given a blue tinge (purple red, magenta). Much work and discussion has taken place over the last few decades in the printing industry about such sets of colors, also known as "scales". The "colder" scales were confronted with "warmer" ones wherein the hues were slightly displaced towards the red, particularly the purple. Following this tendency the "warmer" scale of DIN 16538 and 16539 was considered more progressive than the older and "colder" scales represented by DIN 16508 and 16509.

All these scales or sets of colors comprise colorants produced in the synthetic dye industry over the last 100 years and selected for their individual beauty. In the selection of colorants, not much attention was paid to the spectral properties or curves of the colors for the purpose of the color mixtures since this problem was not appreciated. In general and essentially, a proper color balance was sought by selecting among the available colorants those which were a little more reddish, greenish, blueish, yellowish, etc., i.e. the selection was based on the color cycle and the displacement of the various hues therein. Also required were high purity and saturation but the spectral properties were used practically solely for the determination of the color locus in the color solid. As is known, however, each color locus may be imagined and partially also represented by a family of metameric colors which have different spectral curves and produce different colors when mixed. Furthermore, the requirements of the color separation technique were not sufficiently considered heretofore.

We have found that the conventional assumptions and criteria in the selection of process colors for multicolor printing, and the resultant sets of colors based on these criteria are not sufficient to obtain fine varicolored reproductions. Among the shortcomings of known multicolor printing processes, the following five are well known although their causes are not:

1. THE IMAGE REPRODUCTION IS NOT SUFFICIENTLY COLORFUL

Many color reproductions are available today which are generally considered to be of high quality so that some observers may consider the above statement of an alleged shortcoming surprising. However, since any viewing of a picture involves an abstraction by the individual, which enables him to see even simple black-and-white line drawings as quite vivid and true to reality, even a slight coloring of a picture will support his imagination. Leaving this psychological element aside, it will be readily appreciated that many hues are disadvantaged in respect to reality even when only two colors are mixed and that they are reproduced with insufficient saturation. This becomes obvious when a good color reproduction of a flower is placed side by side with the real flower, or a colorful painting is compared with its reproduction, or an assortment of painted colors available to an artist is observed side by side with a printed scale of colors. Even if only a portion of the hues to be reproduced cannot be properly mixed, the reproduced color picture suffers greatly, and this disadvantage cannot be balanced by the purity or saturation of the primary colors since the picture elements which are reproduced only in these hues are probably no more than a thousandth part of the entire picture whose other elements are reproduced in mixed colors.

Even the colors in those ranges which are less handicapped in substrative color mixing are subject to excessive darkening, particularly in those picture elements which are most intensely colored in the original and where pure and saturated colors are required. Furthermore, the light portions and pastel tones are relatively strongly grayish and there are, additionally, relatively considerable hue distortions. Added to this is the fact that it is impossible in some hue ranges to mix the colors in a manner to differentiate between finer hue differences and nuances, which also contribute to a more natural, three-dimensional impression of the color reproduction.

Where color saturation and three-dimensionally appearing brilliance are lacking, it has usually been attempted to compensate therefor by susing more printing ink and/or printing inks of higher concentration. But this is only partially successful because a higher concentration of coloring medium per unit of printed area increases the darkening of the picture. Furthermore, it makes the printing process more difficult.

2. THE NEUTRAL CONDITION IS INSUFFICIENTLY MET

As is known, the quasi three-dimensional perception of a picture is improved by providing sufficiently black portions indicating depths and a broad range of differentiating portions of lightness and shading. In three-color printing, this effect is sought by dulling a mixed color of the first order, i.e. a color obtained by mixing two primary colors, with the third primary color applied in such a metered or dosed amount of printing ink that it operates to produce a darkened or blackened mixed color of the second order, i.e. a mixture of three primary colors. Depending on the intensity of each component, equal amounts of the three primary colors will mix to produce neutral grays to neutral blacks. In four-color printing, depth perception and shadings are supported by the fourth printing step wherein black is applied.

The sets of colors available in today's printing inks do not make it possible to obtain this neutral color condition. As required in the standards, they produce a neutral black when they are printed in sufficiently transparent layers in completely superposed relationship. However, at lower tonal values, they show some coloring tending frequently towards the reddish or they show different hues within the wedge of tonal values. This insufficient neutral condition has been accepted in the industry, and an attempt has been made to compensate for it by using a steeper gradation of cyan blue than of purple red and yellow as well as by the use of a relatively large amount of black. This, however, darkens the colors unduly. Partly, the primary colors are intentionally darkened which, of course, dulls the picture. Partly, it has been tried to impart more depth and contrast to the picture by using a larger quantity of the coloring media and or by increasing their concentration, which has the above mentioned disadvantages in printing.

3. THE COLORING FLUCTUATIONS DUE TO PRINTING TECHNIQUES HAVE TOO MUCH INFLUENCE ON THE RESULTANT PRINTS

Printing with today's printing machines, particularly with rotary presses, make fluctuations of the amounts of printing ink applied per area unit by ±25% from the desired amount unavoidable. Even larger fluctuations are encountered under some printing conditions. Such fluctuations are particularly disadvantageous in reproductions obtained by multicolor printing, for instance in a mixed color wherein the amount/area of one of the primary color inks is above the desired level while that of the other primary color ink is therebelow. Added to this is the fact that the primary colors change their hues with a change of the amount of ink applied per unit; as it increases, the hues appear more reddish. This is true particularly for purple red or magenta. These fluctuations cause much waste until the primary colors are properly adjusted.

Many attempts have been made to avoid this disadvantage by improving the precision of printing ink dosing or metering arrangements in printing presses. This, however, involves high costs which often are not worthwhile. Furthermore, even the most precise metering of the printing ink will not make it possible to obtain the desired coloring for each element of the picture, for instance when heavy solid-colored areas with high tonal values be next, above or below areas of very low tonal values. In this case, the printer tries to overcome the difficulties by increasing the inking amounts because the increased concentration of coloring medium causes the inking-density curve to flatten out so that the coloring fluctuations have less effect. In fact, however, this is true only for the spectral range of the absorption maximum. In the ranges of the secondary densities, the absorption unfortunately further increases with increased amounts of coloring medium when the coloring medium layers are transparent. This causes the mixed colors to become blacker and to change their hues uncontrollably. The other disadvantages of using increased amounts of printing ink have been previously elucidated.

4. TODAY'S CHROMATIC SELECTION TECHNIQUES REQUIRE TOO MANY CORRECTIONS SO AS TO MAKE THE RESULTS NOT MORE BUT LESS CERTAIN

With available techniques, only very imperfect color reproductions can be obtained with uncorrected chromatic selections. Photomechanical or electronic means are used to compensate as much as possible for imperfections with conventionally available scales of colors. In case of more exacting requirements, the reproductions are even manually touched up. The time and expense for the corrections exceeds those needed for the chromatic selection proper. The corrections, however, do not increase the certainty of the entire chromatic selection process because the interconnection between the parameters which influence the quality of the color reproduction is not properly understood.

Therefore, it continues to be difficult to obtain uniform results with the photomechanical process of chromatic selections. Electronic chromatic selection is very complex because it is based on faulty prepositions.

Often, an attempt is made to emphasize one of the colors considered to be most important but this causes neglect of the other colors. When printing plates are used which are the results of chromatic selections of differing quality or of specifically emphasized colors, the work of the printer is made more difficult. These difficulties become insurmountable when it is impossible to obtain the emphasized colors with reproduction techniques alone and involves also deviations from the primary colors.

Chromatic selection techniques also have been unable to surmount the difficulties caused by secondary optical densities which are necessarily present in the primary colors of available color sets. They lead to undesired darkening which have to be counteracted by masking. This, at times, leads to excessive masking which reduces, together with the undesired darkening, the desired light-shade-modulation so that the depth of the picture is not strong enough — a factor which essentially determines the three-dimensional impression of a reproduction.

If the shortcomings of a poor chromatic selection are noticeable only in a dull look of the picture, the printer may attempt to compensate for this by excessive inking or increased concentration of printing ink. This, however, does not improve the quality of the picture and has all the disadvantages of excessive coloring medium concentration per area unit previously outlined.

5. AUTOTYPY REPRODUCTION PROCESSES ARE PARTICULARLY PROBLEMATIC

In autotypy wherein the tonal values are not determined by differences in the thickness of the layers of coloring media but by areas of different sizes within the dot areas of the screen being printed, the ratio of printed and unprinted areas determines the saturation. While autotypy printing is well adapted for black-and-white pictures, it poses considerable problems in multicolor reporductions.

From the point of view of printing technique, a not too small screen width is advantageous because this makes it possible to keep the interspaces between dots free from printing ink so that the tonal values may be more precisely differentiated. On the other hand, the screen should be sufficiently fine so that the individual dots are perceived as little as possible, according to the resolution capacity of the human eye. Thus, despite their disadvantages in printing, fine screens are usually considered as a sign of high quality and poorer tonal value differentiation is accepted, compensation being sought in smoother paper and more exacting printing techniques. Nevertheless, it is unavoidable that clusters of very small screen dots are as prominent as larger individual dots of coarser screens.

In addition, the white of the background paper surface strongly affects the impression of color, most strongly, of course, in the lowest tonal values. In that range, an area appears almost light grey even when printed with colored printing inks. This disadvantage is further enhanced by the repeatedly mentioned tendency to overcome all such difficulties in color reproduction simply by using higher concentrations of the coloring media. This tendency forces those skilled in the art of color reproduction to provide particularly small dot areas for the lower tonal values and thus further to reduce the colorfulness of the picture. Furthermore, the screen dots are randomly distributed above each other and adjacent to each other or partially overlap, the resultant mixed colors having different hues, saturation and degrees of darkness (*DIN*-

*Dunkelstufe*).

The five above-described shortcomings in multicolor printing are of vastly different nature and it is not at all obvious to overcome them all by a single measure, as provided by the present invention, i.e. by the use of a set of three printing inks, a yellow (cab), a red-violet (cag) and a blue-green (car), each of the colors, when produced by printing these inks on a white background, having density curves bounded by the ranges illustrated in FIG. 6.

It should be noted that the pigments used in these printing inks may be old per se, or they may be new, the invention residing not in the printing inks per se but in the printed colors produced by them when printed together, i.e. in their combination in multicolor printing.

We have found that, in fact, many present disadvantages in multicolor printing, including the five disadvantages explained hereinabove, may be successfully overcome or at least substantially reduced by using coloring media of a set of primary colors which better meet the requirements of subtractive color mixing than available sets of colors. In this manner, the invention aims at an improvement of the entire reproduction process. It accomplishes this by printing with printing inks having a new combination of reproduction colors, thus enhancing the quality of the reproduced picture.

This means that printing is effected with printing inks which produce colors of predetermined spectral properties when properly printed on a given surface, and that the optical or electronic photomechanical work from the original copy to the printing plate may be guided by the selection of these colors.

Throughout the specification and claims, "spectral properties" of the primary colors means the spectral curve of the color, i.e. the dependency of the absorbed and remitted light portions in relation to the wave lengths of visible light.

For practical reasons, the ordinate of the spectral curves does not show the portion of the remitted light, i.e. not the percent of remission R but that of the absorbed light in relation to its optical density D $$\left(D=Lg\,\frac{100}{R}\right).$$

This measurement corresponds more directly with the measuring techniques used during printing and chromatic selection because, in each instance, a certain spectral portion is absorbed by the layers of coloring media and is measured in the logarithmic optical density measuring scale with a densitometer in conformity with the perception of the human eye. A logarithmic measuring scale is also used for the abscissa, with six wavelengths within the visible spectrum which are selected as particularly characteristic. They form an equidistant scale for the abscissa, each superposed wavelength being derived from the preceding one not by the addition of a constant but by multiplication with the factor $\sqrt[8]{2}$. The selected wavelengths along the abscissa are at 416, 454, 495, 540, 589, 642 nm.

As has been stated, the printing ink layers in the reproduction of colored images should absorb only certain spectral portions of the light and remit all other light portions as unhindered by the white background as possible, several spectral densities of superposed coloring media layers adding to each other while the remitted spectral light portions are substracted from each other. Considering this phenomenon, we have chosen to use the terms "color absorbing blue", "color absorbing green" and "color absorbing red" for the three primary colors or, for short, cab, cag and car. The associated concepts blue, green and red correspond to the perception of substantially monochromatic light of the wavelengths 454, 540, and 642 nm.

The system of the three primary colors according to the present invention can be well described and understood by the above-described measuring system for the spectral curves. These curves are characterized by their maxima ($D_{max}$), minima ($D_{min}$) and points of intersection which, in the ideal case, are at the six selected wavelengths of the visible light. In the chosen coordinate system, the spectral curves run, in the ideal case, between wavelengths 454 nm and 589 nm, and are bell-shaped and symmetrical in respect to the axes of the maxima and minima. The legs of adjacent spectral curves are symmetrically opposed to the points of intersection. Again, in the ideal case, two of the curves always intersect at wavelengths at which the third curve reaches its maxima ($D_{max}$) or minima ($D_{min}$), the maxima being associated with points of intersection in the range of low optical densities ($S_n$) and the minima being associated with points of intersection in the range of higher optical densities ($S_h$).

The ideal condition is illustrated in FIG. 1 wherein the spectral curves of three primary colors making up a set according to this invention are shown. As will be noted from this figure, this set meets all of the following conditions, the broken line in all figures indicating the spectral curve of cag, the full line indicating cab, and the chain-dotted line indicating car:

| | | |
|---|---|---|
| At 416 nm, | cag = $D_{min}$, | cab and car = |
| At 454 nm, | cab = $D_{max}$, | cag and car = $S_n$ |
| At 495 nm, | car = $D_{min}$, | cab and cag = $S_c$ |
| At 540 nm, | cag = $D_{max}$, | cab and car = $_n$ |
| At 589 nm, | cab = $D_{min}$, | cag and car = $_c$ |
| At 642 nm, | car = $D_{max}$, | cab and cag = $S_n \cong D_{min}$ |

All indicated optical densities are based on the spectral optical density ($D_O$) of the white surface of the substrate or background on which the reproduction is printed, usually paper. The densities are numerically within the range of the densities obtained in the respective printing processes used for different substrates and/or printing inks. Thus, $D_{max}$ as a reference point for all other density levels of the sets of colors according to the invention has the same values as are obtained with different printing processes for the normal inking of the entire printed surface. In measuring "density", it should be noted that presently used densitometers with spectrally imperfect broad band filters may give incorrect values and that more accurate density measurements will be obtained with densitometers having spectrally correct narrow band filters or with spectral photometers.

The term "normal inking" indicates the amount of ink printed on the surface which a printer skilled in the art will apply for optimum results, i.e. not too little and not too much. This has been defined in the scientific literature in connection with different printing processes for obtaining a good color reproduction or print.

In the ideal case, the figures of all three $D_{max}$, all three to four $D_{min}$, all three $S_h$ and all two to three $S_n$ are situated on levels of densities which correspond exactly to each other. Under these conditions, the $S_h$ values are relatively large, i.e. larger than ½$D_{max}$ and, ideally, at 7/10th of the maxima values. On the other hand, bell-shaped spectral curves can be obtained only when the $S_h$ values are not substantially in excess of 4/5th of the maxima. (The exception is the $S_h$ of cwb and cwr at wavelength 416 mμ. In the shortest wave end of the spectrum of visible light, large deviations are possible in actual practice from the ideal densities and the ideal points of intersection.) In the ideal case, the $D_{min}$ should be as small as possible and $S_n$ should be smaller than ¼$D_{max}$, preferably smaller than 1/7th of $D_{max}$.

The distinct difference between the set of three primary colors selected according to the invention and as illustrated in FIG. 1, and conventional color scales is shown by FIGS. 2 and 3, FIG. 2 illustrating the spectral curves of the primary colors according to the standards of DIN 16508 and FIG. 3 those of DIN 16538. The spectral curves in these figures are taken from photometric measurements of prints produced on normal art reproduction paper (DIN 16519) with commercially available printing inks matching these standards. This indirect method of comparison was necessary because conventional sets of colors were not defined by the spectral curves of the colors but by their locus in the color solid. It should be noted that the two illustrated color sets have been considered as the best available. They are used internationally under different names. The newer and better scale according to DIN 16538 and the corresponding scale DIN 16539 are considered norms known as "European color scales" in a number of European countries. As FIGS. 2 and 3 clearly show, their spectral curves show some considerable deviations from those required by this invention.

Although the shape of the spectral curves and their interrelationships are more important and characteristic than the color impression and the locus of the colors in the color solid which are the result of the spectral curves of the three primary colors, these novel spectral curves of the colors of the scale of the invention produce, of course, hue differentiations perceived by the human eye. The color absorb blue, i.e. a yellow, looks more reddish than the yellows of conventional scales, the color absorb green looks more blueish than conventional purple reds or magentas, and the color withhout red looks greener than conventional cyan blues or cyans.

Thus, even the hues of the primary colors of the present invention differ more strongly from the conventional primary colors used in multicolor printing than the difference between cold and warm color scales heretofore encountered. Therefore, we have not called cag and car by the old names "red" and "blue" used synonymously heretofore to designate the appearance of the chromatic selection filter and the reproduction color. The color absorbing green according to the invention lies about mid-way between red and violet wherefore it cannot be properly called red. The color absorbing red according to this invention looks turquois, i.e. it is no longer blue but it is not yet green.

As pointed out hereinabove, the spectral curves of the three primary colors according to the present invention pass through their density minima at 416, 495, and 589 nm. In these curves, the wavelengths at the density minima determine to a large extent the hue of the resultant colors. And the three wavelengths lie in the range of minimum color perception which are equidistant, in the selected abscissa measuring scale, from the perception maxima of blue, green and red. Therefore, the three primary colors of the set of the present invention affect the color perception of the viewer relatively little. In contrast thereto, intensively colorful colors have been preferred in conventional color scales. Thus, the present invention runs counter to the conventional tendency in having found that the use of primary colors with relatively low colorfulness produces color and printing advantages, and even leads, as will be explained hereinafter, to more colorful pictures.

Since colorants, i.e. pigments and dyes, have been developed and selected for more than a 100 years solely on the basis of their own color beauty, rather than on their spectral properties for substractive color mixing and certainly not on the basis of mixing colors in multicolor printing, as outlined herein, no coloring media have been available for practical experimentation to obtain a set of colors fulfilling the ideal conditions hereinabove set forth. Therefore, available coloring media were tested in respect of their spectral properties and an attempt was made to select and mix them so as to approach the ideal conditions shown in FIG. 1. It was found that considerable improvements could be attained in multicolor printing in the reproduction of colored images even with the available choices and admixtures of coloring media if so combined as to approach the ideal case. Furthermore, these practical results showed that the outlined theory was, in fact, supported by the results.

FIG. 4 shows the spectral curves of a set of printed colors for color reproduction wherein pigments were used exclusively as coloring media while FIG. 5 is a like illustration of a set of soluble dyes used as coloring media.

Merely by way of illustration, the following examples illustrate specific printing inks used in the sets shows in FIGS. 4 (Example 1) and 5 (Example 2) all parts being by weight: and the numbers of the coloring media referring to the Color Index

| | EXAMPLE 1 | |
|---|---|---|
| Golden yellow: | Pigment Yellow 83 | 7.8 |
| | Pigment Yellow 13 | 7.8 |
| | Filler | 5.9 |
| | Resin ester | 0.2 |
| | Modified phenol resin | 20.8 |
| | Drying oil | 8.5 |
| | Alkyd resin | 23.9 |
| | Mineral oil | 23.7 |
| | Aluminum soap | 0.2 |
| | Hard paraffin | 1.2 |
| Violet-red: | Pigment Red 81 | 6.8 |
| | Pigment Violet 1 | 10.1 |
| | Filler | 8.0 |
| | Modified phenol resin | 21.4 |
| | Drying oil | 8.8 |
| | Alkyd resin | 23.1 |
| | Mineral oil | 20.7 |
| | Hard paraffin | 1.1 |
| Turquoise blue: | Pigment Green 7 | 9.2 |
| | Pigment Blue 15 | 7.1 |
| | Filler | 6.1 |
| | Resin ester | 0.1 |
| | Modified phenol resin | 20.9 |
| | Drying oil | 8.6 |
| | Alkyd resin | 24.7 |
| | Mineral oil | 22.0 |
| | Aluminum soap | 0.1 |
| | Hard paraffin | 1.2 |
| | EXAMPLE 2 | |
| Golden yellow: | Basic Yellow 28 | 18.2 |
| | Maleic acid resin | 33.1 |
| | Ethyl cellulose | 8.1 |
| | Various glycols | 40.6 |
| Violet-red: | Pigment Violet 1 | 8.9 |

-continued

| | | |
|---|---|---|
| | Pigment Violet 2 | 6.1 |
| | Maleic acid resin | 23.4 |
| | Ethyl cellulose | 5.7 |
| | Triethanolamine | 17.7 |
| | Various glycols | 35.6 |
| | Dispersing agent | 2.6 |
| Turquoise blue: | Pigment Blue 15 | 3.7 |
| | Pigment Green 7 | 4.9 |
| | Solvent Green 14 | 1.0 |
| | Maleic acid resin | 23.9 |
| | Ethyl cellulose | 6.4 |
| | Triethanolamine | 17.3 |
| | Various glycols | 42.8 |

These figures show that it suffices, in practicing the invention, if the ideal conditions are approached within the claimed limits, as illustrated in FIG. 6. These limits do not form bands of uniform width but the tolerance band is sometimes wider and then narrower. At the density maxima and towards the two ends of the visible spectrum, the tolerances are greater than at other points of the spectral curves.

According to the invention, the three printed colors of the printing inks must lie within a band defined by two spectral curves of the following parameters:

| Range of Wavelengths | Optical density in % of $D_{max}$ cab | cag | car |
|---|---|---|---|
| 407 to 423 nm | 65 to 93 | 2 to 27 | 39 5o 79 |
| 453 to 456 nm | 89 to 101 | 10 to 25 | 12 to 25 |
| 492 to 496 nm | 60 to 74 | 65 to 81 | 1 to 10 |
| 538 to 541 nm | 4 to 14 | 88 to 103 | 13 to 25 |
| 584 to 591 nm | 1 to 3 | 50 to 75 | 65 to 88 |
| 633 to 646 nm | 1 to 3 | 1 to 4 | 84 to 109 |

In accordance with a preferred embodiment of the invention, the color absorbing has a particularly high optical density in the longer wave range. Its spectral curve deviates from a bell shape beyond 589 nm even more distinctly than shown in FIG. 1. In other words, it does not reach a maximum at 642 nm but remains at high density at least to wavelength 675 nm, preferably to the end of the visible spectrum. Such a cwr constitutes a counterbalance to the fact that no yellow colorants are presently available whose spectral curves again reach higher density in the longer wave range and thus present a constantly bell-shaped curve beyond 589 nm. If such an cwr rather intensively extinguishes the red toward the end of the visible spectrum, it improves the neutral conditions, the mixed color blue and particularly the mixed color green even more.

A number of disadvantages in multicolor printing of color reproductions may be avoided or reduced with printed colors selected according to the present invention, more particularly the five shortcomings hereinabove described:

1. For the following reasons, the color reproductions look more colorful: secondary densities which darken the picture because they also absorb such spectral light portions which should be remitted from the white background without weakening, can be much more readily avoided. Richer nuances of hues and more uniformly differentiated mixed colors are obtained so that no more extended and more confined, or more or less saturated sectors occur in the color cycle, due to the matching spectral curves of the three primary colors, the bell shapes of the curves with their smoother changes in direction, more balanced distances and more symmetrical as well as reduced overlapping. Furthermore, the primary colors may be printed lighter and, compared with the conventional color scales, less intense because each of the primary colors is now more balanced and absorbs only a third of the spectrum, i.e. that spectrum range selected, while two thirds of the spectrum is remitted or reflected by the white background. Therefore, the light parts of the picture appear more colorful. When two primary colors are printed together, for instance, two thirds of the spectrum are absorbed without deformation or undesired overlapping so that strong and intensive mixed colors can be produced from lighter appearing primary colors. All the disadvantage of increased concentration of coloring medium per area unit are avoided because the printer is no longer tempted to use this measure for increase of colorfulness. This further makes it possible to keep the tonal values derived from dosing the printing ink on the printing plate more manageable. This enables a more accurate selection of the desired colors for each element of the reproduction, which further increases the quality of the color image.

2. For the first time, the invention makes it possible to fulfill the neutral conditions. When the three primary colors of the set according to this invention are printed in different but equal tonal values, neutral gray tones are produced in each case and not, as with conventional color scales, colored mixed colors of the second order or even, at different tonal values, differently hued mixed colors. When the color system itself accurately reproduces all shades and depths, the viewer has a more three-dimensional impression of the picture. No fundamentally wrong expedients need to be used for this purpose, such as dulling of the primary color, over-emphasis on black in four-color prints or excess amounts of coloring medium, or the problems and shortcomings of color masking. A clean neutral condition manageable through all tonal values also confirms indirectly that all other mixed colors for various picture elements can be attained dependably with differently dosed primary colors.

3. Any differences in the dosage of the printing inks, which cannot be avoided in commercial printing operations, will produce fewer deviations of the mixed colors than with conventional color sets. The well known differences in hues due to such changes in the coloring media doses are avoided. Since the spectral curves extend symmetrically to the axes at the selected wavelengths in the coloring media of the present invention, the hues of the primary colors change less with the concentration of the coloring media per area unit, which is a known and undesired condition with known color scales. Therefore, undesired deviations in hues can be minimized with primary and mixed colors, together with the concomitant disadvantages, such as false color reproduction, lacking colorfulness, excessive inking, sorting and waste. Furthermore, special printing ink dosing devices on the printing presses may become dispensible.

4. Since the color system of the invention holds density distortions at the selected wavelengths low, reduces overlapping of the spectral curves or makes it more symmetrical, the excessive amount of corrections in making chromatic selections is substantially reduced or avoided. The entire chromatic section process is rationalized, with fewer sources of errors leading to the above-indicated difficulties in excess application of printing ink.

5. The set of colors according to this invention is particularly advantageously applied to printing inks used in autotypy reproduction processes so that the invention becomes even more valuable in this technique than in photo-gelatine or screen printing or in the variable depth photoengraving process.

In the system of the selected and related wavelengths, the spectral maxima and minima of the reproduction colors have been positioned equidistantly between the additive primary colors blue, green and red which are perceived by the human eye as being most colorful. Therefore, the reproduction colors according to the present invention appear to the human eye with relatively little intensity and with less contrast to the white background. Only after they have been printed together, i.e. as mixed colors, they assume the hues intensely perceived as colors by the human eye. Therefore, on the autotypy screen, the primary colors in the individual screen dots are less intensely perceived. Since the screen dots are less intensely perceived, coarser screens may be used, leading to better tonal value differentiations and reducing printing difficulties. Primary colors which are less intensely perceived and which may be weaker may be dosed or metered accurately even in the range of low tonal values.

What is claimed is:

1. In a method for reproducing a multicolored image by printing on a white background with printing inks of the three primary colors, i.e. a color absorbing blue, a color absorbing green and a color absorbing red, the step of selecting the primary colors so that the printed colors have spectral density curves passing through matching ranges of optical densities at characteristic wavelengths on the visible spectrum, the ranges being within the following parameters:

| Range of Wave lengths | Optical Density in % of $D_{max}$ color absorbing blue | color absorbing green | color absorbing red |
|---|---|---|---|
| 407 to 423 nm | 65 to 93 | 2 to 27 | 39 to 79 |
| 453 to 456 nm | 89 to 101 | 10 to 25 | 12 to 25 |
| 492 to 496 nm | 60 to 74 | 65 to 81 | 1 to 10 |
| 538 to 541 nm | 4 to 14 | 88 to 103 | 13 to 25 |
| 584 to 591 nm | 1 to 3 | 50 to 75 | 65 to 88 |
| 633 to 646 nm | 1 to 3 | 1 to 4 | 84 to 109 |

$D_{max}$ marking the range of the maxima of the three spectral density curves, which is spaced from the optical density of the white background $D_0$ by a distance corresponding to the density of the solid areas obtained by printing with normal inking.

2. The multicolor printing method of claim 1, wherein the spectral density curve of the color absorbing red does not pass through a maximum at 642 nm but shows maximal density values in the range between 635 and 700 nm, exceeding the $D_{max}$ level at wavelengths above 642 nm.

3. A set of three printing inks for use in multicolor printing with three colors, comprising three printing inks respectively printable on a white background as a color absorbing blue, a color absorbing green and a color absorbing red, the printed colors having the respective density curves bounded by the ranges illustrated in FIG. 6.

4. A multicolored print on a white background, comprising three printed inks respectively having the primary colors with the density curves bounded by the ranges illustrated in FIG. 6.

* * * * *